Patented Aug. 6, 1946

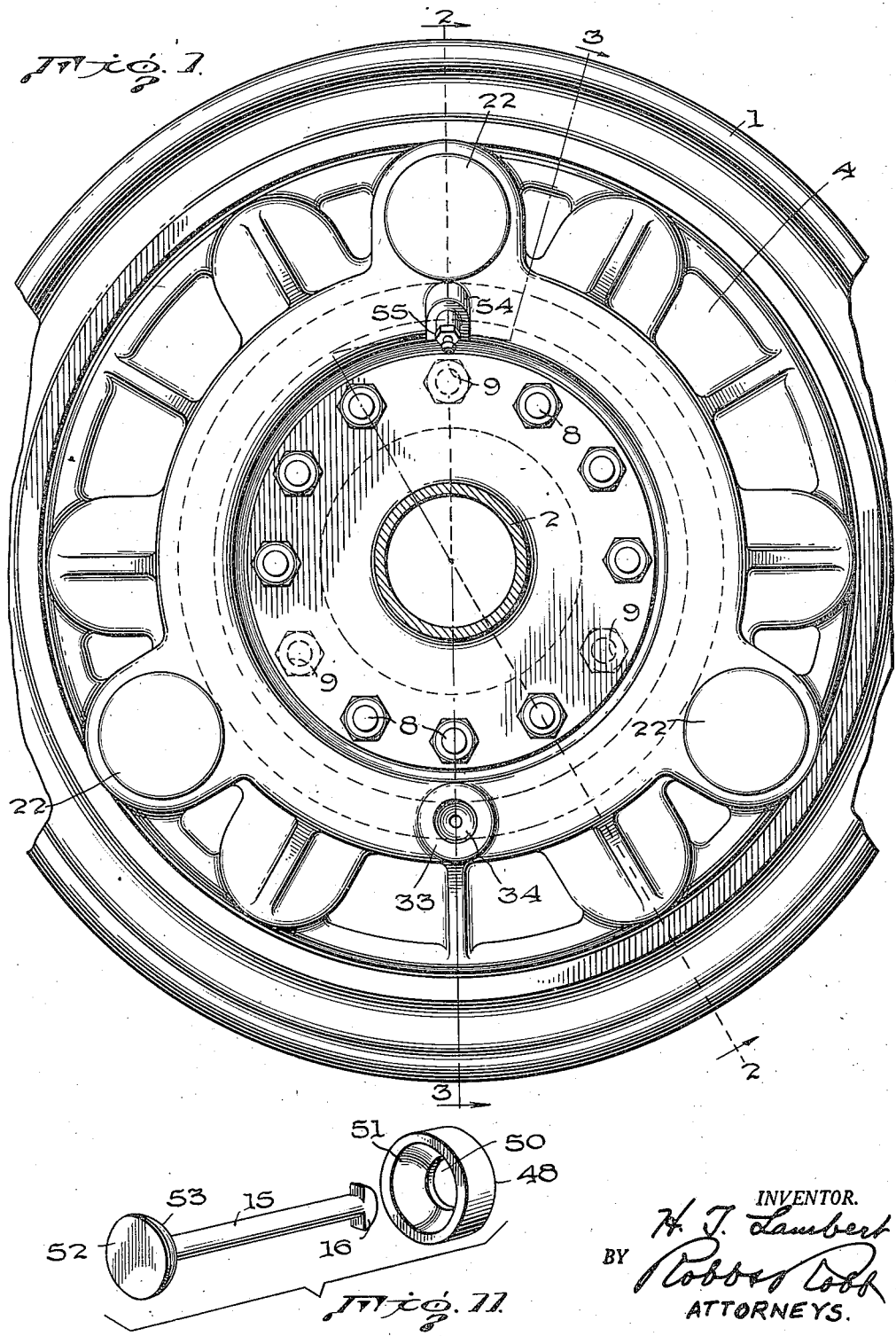

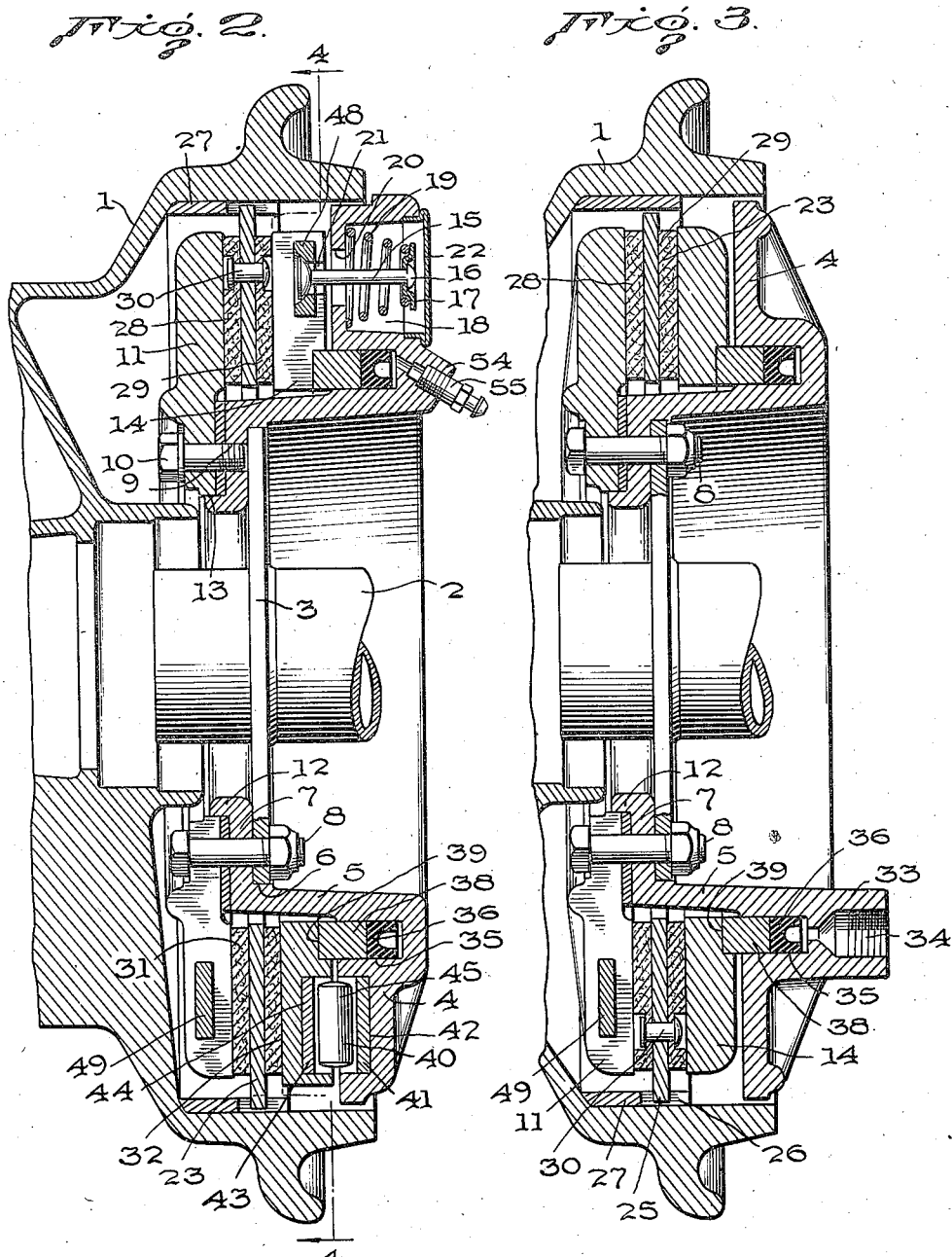

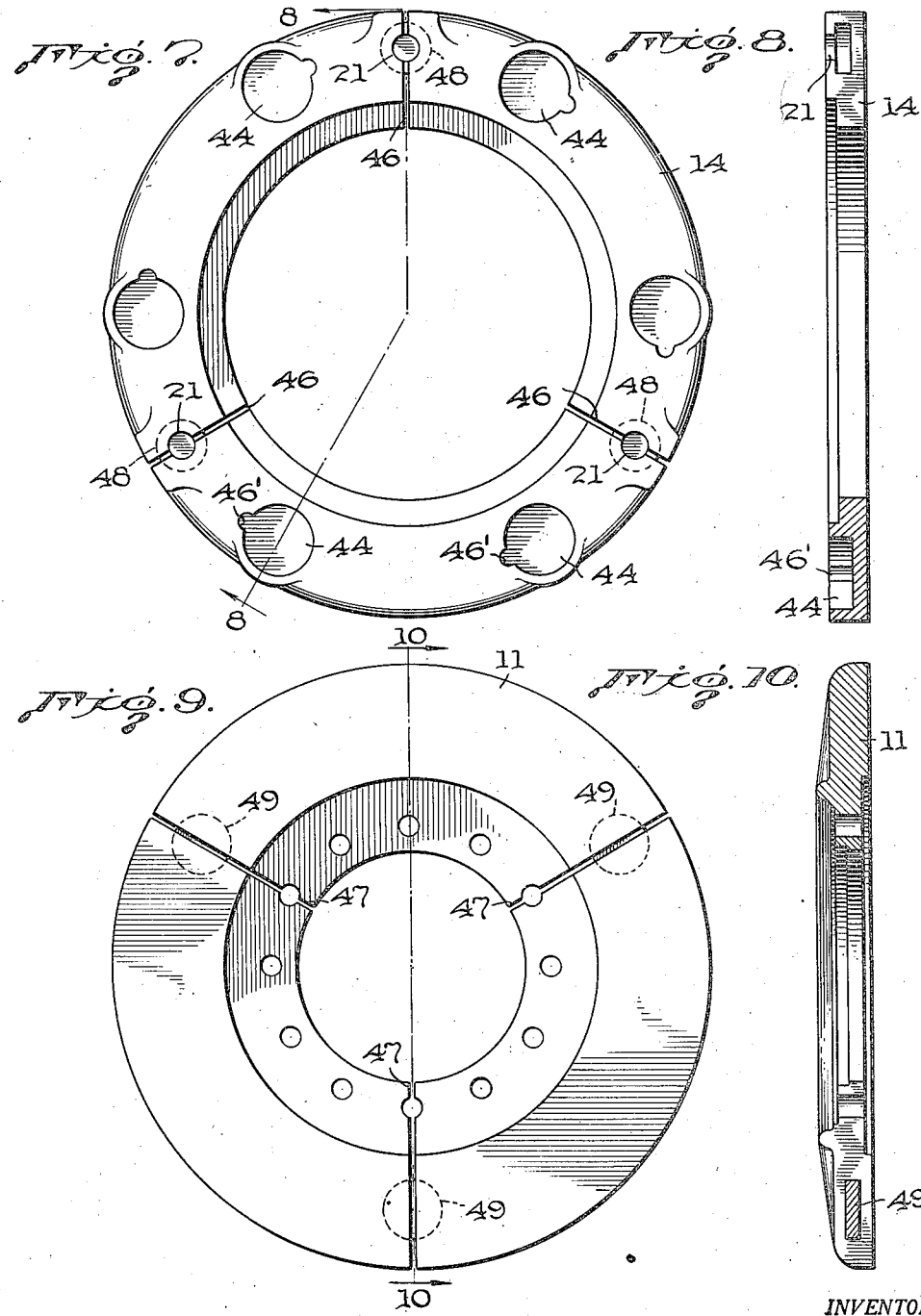

2,405,219

UNITED STATES PATENT OFFICE 2,405,219

DISK BRAKE

Homer T. Lambert, St. Joseph, Mich., assignor to Lambert Brake Corporation, St. Joseph, Mich., a corporation of Michigan Application May 28, 1943, Serial No. 488,864

6 Claims. (Cl. 188—72)

My invention relates to improvements in power transmission and absorption devices commonly known as clutches and brakes and the like, and particularly to the friction members of such devices, by means of which the power is transmitted or dissipated, as the case may be.

In the case of brakes for use in conjunction with airplane wheels or with other rotating parts characterized by their relatively high speed and/or severe loads, considerable heat is generated, with consequent expansion and warpage, and frequent rupture or breakage of the braking elements. This is especially prevalent in the so-called disk brakes where the friction elements are of circular or disk form. Of course, the destructive cracking or breaking of the disks may, in some measure, be reduced by the proper selection of materials from which the brake elements are constructed, but even then, it cannot be practically eliminated by the choice of materials alone, under certain conditions of use.

I have found that by dividing the brake elements into sections, in the case of disk brakes, and mounting said sections so as to provide suitable clearance therebetween, the life of the brakes under severe or heavy duty operation is increased as much as tenfold, without interruption of service or break-down, while at the same time materially improving the flexibility and efficiency of the brakes. The same advantages follow from the application of the above principle to heavy duty or high speed clutches of the disk type. In each case, my invention makes the use of grey iron, and especially copper grey iron, entirely feasible and satisfactory for the friction members of the brake or clutch.

With the foregoing general object of durability in view, my invention is further characterized by the novel means of alignment of the sectional brake elements, and the improved assembly of such elements into an exceedingly simple, compact and efficient form, particularly adaptable to brakes for airplane wheels of various sizes ranging upwardly from the comparatively small wheels of light training planes.

Other and further objects and advantages of the invention will be hereinafter described, and the novel features thereof defined by the appended claims.

In the drawings:

Figure 1 is a view in end elevation of a brake assembly constructed in accordance with my invention, said assembly being shown as applied to a conventional airplane wheel;

Figure 2 is a sectional view taken through the brake assembly and wheel mounting along the line 2—2 of Figure 1, with only a portion of the wheel shown in this view;

Figure 3 is a sectional view generally similar to Figure 2, as taken on the line 3—3 of Figure 1;

Figure 7 is a view in side elevation of the sectional primary brake disk;

Figure 8 is a sectional view taken on the line 8—8 of Figure 7;

Figure 9 is a view in side elevation of the sectional secondary brake disk;

Figure 10 is a sectional view taken on the line 10—10 of Figure 9; and

Figure 11 is a composite perspective view of one of the tie-bolts and its associated hollow alignment plug for the sectional primary brake disk.

Figure 4:
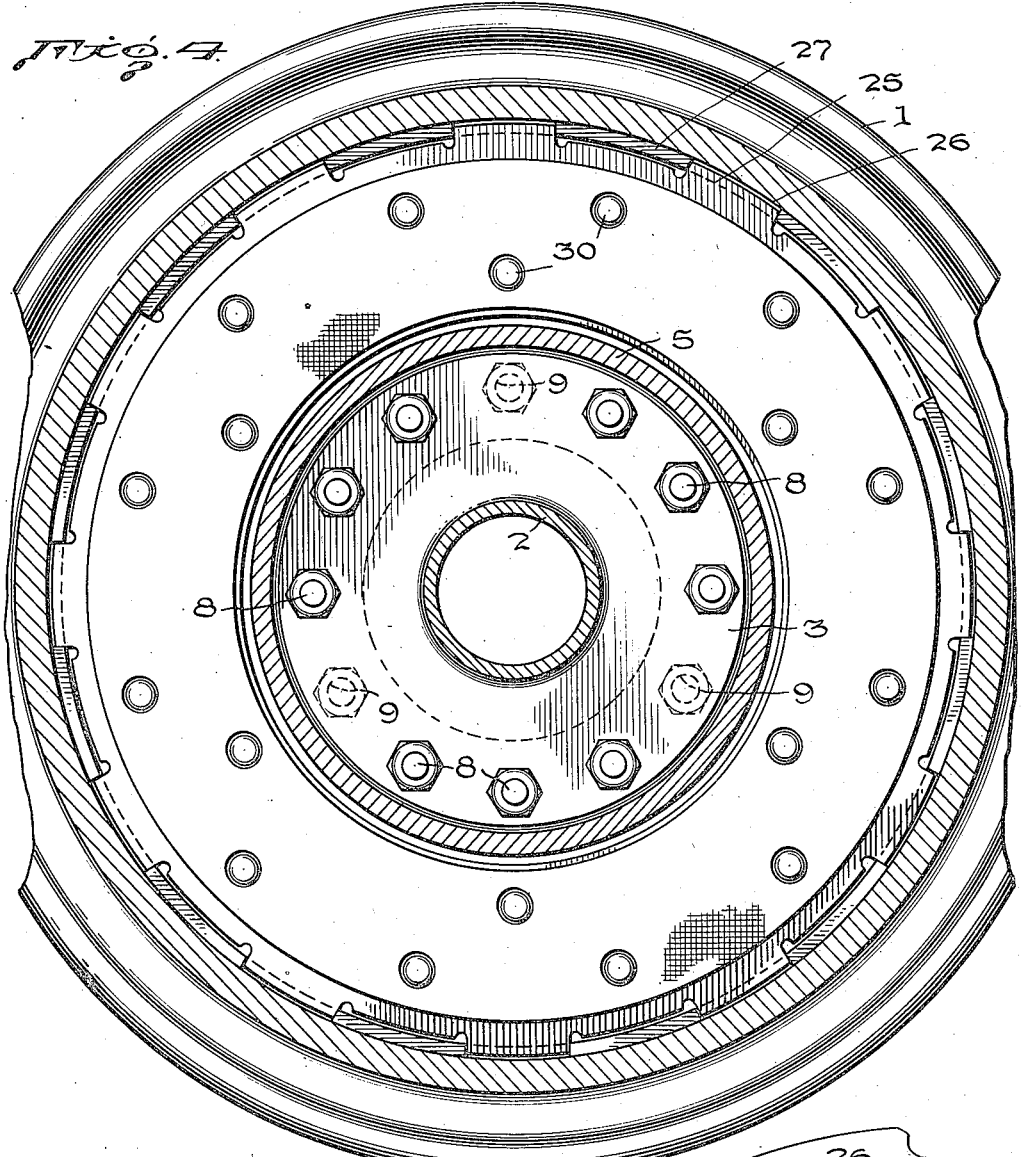
Figure 4 is a sectional view taken on the line 4—4 of Figure 2, looking in the direction of the arrows, and particularly illustrating the driving connection between the wheel and the middle or rotary brake ring of the brake assembly.
Figure 5:
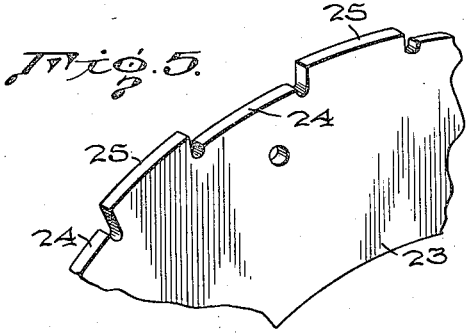
Figure 5 is a fragmentary perspective view of the outer portion of the middle rotary brake ring, showing the radially-projecting driving lugs.
Figure 6:
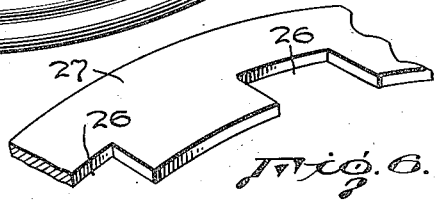
Figure 6 is a fragmentary perspective view of the wheel ring which is carried by the wheel and cooperates with the driving lugs of the middle rotary brake ring shown in Figure 5, to rotate the latter with the wheel.

Like reference characters designate corresponding parts in the several figures of the drawings, wherein 1 generally denotes a wheel of any suitable type, such as a conventional airplane wheel. It is to be understood, of course, that my invention is not limited to airplane wheel brakes, since it is equally well adapted to automobile and other vehicle wheels, as well as to clutches and brakes in general for transmitting or absorbing power.

According to the arrangement and construction of the brake assembly which will be hereinafter described in detail, and which is shown in the drawings for illustrative purposes only, the wheel 1 is mounted for rotation upon an axle (not shown) in the conventional manner, said axle customarily extending through a housing 2 having a fixed flange 3 provided thereon adjacent to the end of the housing. The brake assembly is mounted upon the flange 3 so as to be supported thereby in coaxial relation to the wheel 1.

Referring now to Figures 1 to 4 inclusive, it will be seen that the brake assembly includes a fixed annular plate or part 4 having a hub-like portion 5 axially extended therefrom towards one side thereof and provided with a shoulder 6 adapted to seat about the margin of the axle housing flange 3. Beyond the shoulder 6, the hub portion 5 of the plate 4 is provided with a radially inwardly extended flange 7 which is adapted to abut against the face of the flange 3, as best shown in Figures 2 and 3. The flange 7 is provided with a series of equidistantly spaced apertures through certain of which may be inserted the mounting bolts 8, said mounting bolts passing through suitably aligned bolt holes in the flange 3. In addition to the bolt holes for the bolts 8, the flange 7 is preferably provided with a plurality of tapped holes 9, at least three in number, which are located intermediate the holes for the bolts 8 and arranged in equidistantly spaced relation to each other about the flange 7, as best shown in Figure 1. The purpose of these tapped holes 9 is to receive the cap screws 10 by means of which the secondary brake disk 11 of the brake assembly is fixed to the flange 7 of the plate 4. Thus, the secondary brake disk 11 is held fixed with the stationary plate 4, while both the plate 4 and the brake disk 11 are supported by the housing flange 3 in concentric relation to the latter. To aid in the coaxial assembly of the secondary brake disk 11, the flange 7 terminates at its inner edge in an axially extended flange 12, thereby providing a shoulder 13 about which the inner margin of the brake disk 11 seats.

Positioned between the plate 4 and the secondary brake disk 11, and extending about the hub 5 of the plate 4, is a primary brake disk 14 of annular form which is connected to the plate 4 so as to have a limited axial and rotative movement relative thereto. The connection between the primary brake disk 14 and the stationary plate 4 is established by means of a plurality of equidistantly spaced tie-bolts 15 extended from the brake disc 14 through the plate 4 and terminating in a flattened T-shaped head 16 over which may be applied a retaining washer 17 having an opening therein which is of greater dimension in one direction than the other, so that the head 16 of the tie-bolt may be passed through said opening. Thereafter, by giving the washer 17 a partial turn on the tie-bolt 15, the washer becomes interlocked with the tie-bolt to prevent displacement thereof. As shown in Figure 2, the plate 4 is provided with a well 18 about each tie-bolt 15, and seated in each well is a coil spring 19 abutting at one end against the retaining washer 17, and at its other end, against the bottom of the well. Through the provision of the springs 19, the primary brake disk 14 is resiliently connected to the plate 4, and is free to yield both axially and rotatively relative thereto. Both the plate 4 and the brake disk 14 are provided respectively with openings 20 and 21 affording sufficient clearance relative to the tie-bolts 15 to permit the axial and rotative movements of the primary brake disk as above referred to. Mounted over the outer end of each of the spring wells 18 in the plate 4, is a dust cover 22 to prevent the entrance of dust, water, and other foreign matter into the interior of the brake assembly.

Located between the primary brake disk 14 and the secondary brake disc 11 is a rotary middle brake ring 23, which is so connected with the wheel 1 as to be rotatable therewith. Said connection may have any suitable form, and as shown in the drawings by way of illustration, the outer margin of the brake ring 23 is preferably notched at 24 to provide a plurality of equidistantly spaced driving lugs 25 radially projecting therefrom. These driving lugs 25 are adapted to seat in corresponding recesses 26 formed in a wheel ring 27 mounted in the wheel 1 and fixed thereto in any suitable manner. It will be seen that the recesses 26 in the wheel ring 27 are of substantially greater depth than the width of the driving lugs 25 on the brake ring 23, so that the driving relation between the brake ring and the wheel will be maintained while permitting free axial movement of the brake ring 23.

The middle brake ring 23 is preferably provided at its opposite sides with suitable friction linings 28 and 29 respectively, said friction linings being secured thereto in any suitable manner, as by means of the rivets 30. As shown in the drawings, the brake lining 28 is disposed for engagement with the braking surface 31 forming the contiguous side of the secondary brake disk 11, and the lining 29 is disposed for engagement with the braking surface 32 forming the opposing side of the primary brake disk 14.

It will be understood from the foregoing description that in order to produce a braking action upon the wheel 1, when the latter is rotating and is thus producing corresponding rotation of the middle brake ring 23, it is necessary to axially move the primary brake disk 14 towards the secondary brake disk 11, thereby engaging the braking surfaces of these disks with the friction linings on the middle brake ring 23. In accomplishing such axial movement of the primary brake disk 14, the brake ring 23 is free to move axially towards the secondary brake disk 11 under the influence of the pressure exerted thereagainst by the primary brake disk 14. While this braking operation may be produced by the direct application of a thrusting force against the primary brake disk 14, as obtained from suitable mechanical, hydraulic, pneumatic, or other controls commonly employed in brake systems, I prefer to provide suitable servo means for my brake to aid in the production of the braking operation. It is to be understood, however, that the servo means which will now be described is not essential to my invention and I do not wish to be limited thereto.

According to the construction best illustrated in Figures 2 and 3, 33 designates an inlet boss provided on the plate 4 and having a hall or passage 34 leading into and communicating with an annular groove or channel 35 provided in the plate at its side next to the primary brake disk 14. Disposed in the channel 35 is a fluid seal 36 made of rubber or other suitable sealing material of self-sustaining form, suitable for sealing the channel 35 against the escape of fluid pressure admitted into the channel through the inlet boss 33. At the inner side of the seal, there is provided a ring of insulating material, designated 38, which serves to minimize the transfer of heat between the brake disks and the plate 4, and additionally serves as a pilot ring to centralize the primary brake disk 14 relative to the central axis of the brake assembly. To the latter end, the face of the primary brake disk 14 opposite to the braking surface 32 is provided with an annular recess 39 in which the outer end of the pilot ring 38 is adapted to seat. Accordingly, the primary brake disk 14 will always be maintained centralized during its relative axial and rotative movements hereinbefore referred to.

By the introduction of a pressure fluid of either the hydraulic or pneumatic type, from a suitable source (not shown), and under the usual control of the operator of the airplane or other vehicle, through the hall or passage 34, into the pressure channel 35, the seal 36 and pilot ring 38 are caused to be forced outwardly of said channel, thereby exerting an axial thrust upon the primary brake disk 14, and producing an initial braking engagement of the braking surfaces 31, 32 with the middle brake ring 23. This initial engagement of the braking surfaces imparts a drag to the primary brake disk 14, causing the latter to move angularly or rotatively about its central axis against the yielding pressure exerted by the springs 19. This relative rotative movement of the primary brake disk is utilized to actuate or energize the servo means generally designated 40, said servo means being of any suitable construction such as is disclosed in my prior Patent No. 2,063,445, granted December 8, 1936. For the purposes of illustration herein, the servo means are shown in the form of a series of circular inserts 41 mounted in corresponding sockets 42 formed in the plate 4, and an opposing series of circular inserts 43 mounted in corresponding sockets 44 provided in the primary brake disk 14. Each of the inserts is provided with oppositely inclined camming surfaces, which in the case of use of intermediate rollers 45, arranged between the opposed pairs of inserts, define a substantially V-groove in each insert, with the V-groove extending diametrically across the insert. The sockets 44 in the primary brake disk are preferably provided at one side with a radially offset notch or recess 46' to receive a correspondingly shaped projection extended radially from its respective insert 43, the purpose of which is to fix the inserts in the primary brake disk 14 against angular movement in their respective sockets. The opposing inserts 41 in the plate 4 are preferably free to turn angularly in their respective sockets 42.

Now as the primary brake disk 14 takes up a limited angular or rotative movement pursuant to the initial application of the brake through the fluid pressure medium or otherwise, as hereinbefore described, the rollers 45 arranged between the opposed pairs of camming inserts 41, 43 are caused to ride up the camming surfaces thereof, thereby exerting a further powerful axial thrust upon the primary brake disk 14. This additional axial thrust produced by the servo means results in a powerful and effective braking engagement of the braking surfaces, with consequent retardation or stopping of rotation of the wheel 1, as desired.

Excepting for the features now to be described, the heat generated in the primary and secondary brake disks, during the braking operation described above, would quickly warp and crack or otherwise rupture the brake disks, especially under conditions of brake operation at high speed and heavy loads. These difficulties may be completely avoided by dividing both the primary and secondary brake disks, designated 14 and 11 respectively, into a plurality of separate sections as best shown in Figures 7 to 10 inclusive. That is to say, after the completion of the usual machining operations required in the one-piece manufacture of the primary and secondary brake discs, these discs are split or cut apart on radial lines as indicated at 46, in the case of the primary brake disc 14, and indicated at 47, in the case of the secondary brake disk 11, the lines of severance of the respective disks dividing each disk preferably into three sections. In the assembly of the primary and secondary disks in the brake unit, the lines of severance between the sections of the respective disks are preferably displaced 60° as shown by their relative positions appearing in Figures 7 and 9.

In order to assemble the sections of the respective primary and secondary disks, and to hold the sections of each disk in alignment with one another, they are preferably milled out at the contiguous edges of the respective sections to provide a socket for the reception of a circular plug designated 48, in the case of the primary disk 14, and 49 in the case of the secondary disk 11. With the disk sections disposed in assembled relation as shown in Figures 7 and 9 respectively, the plugs 48 and 49, which may be made of steel, occupy positions in their respective sockets such that approximately one-half of each plug extends into each of the contiguous ends of the disk sections, thereby holding the disk sections in alignment with one another while at the same time affording some flexibility of the disk sections to permit uniform engagement of the braking surface of each disk with the middle brake ring 23, especially under conditions of slight misalignment of the brake members or irregularities in the braking surfaces thereof. In will be further observed that in cutting the respective disks 14 and 11 into a plurality of sections, sufficient material is removed at the severed ends of the sections to allow ample clearance between the contiguous ends for expansion resulting from the generation of heat due to braking applications. It is this clearance between adjacent sections of the respective brake disks which prevents the setting up of localized strains in the disks, which would otherwise evidence themselves by warping, checking, or cracking of the disks.

In the forming of the plug sockets for the plugs 48 in the primary brake disk 14, the disk is preferably drilled part way through at least at each line of severance before the disk is cut apart into sections, said drilled openings being designated 21 and serving both as a relief hole for the milling cutter, as well as an opening for the respective tie-bolts 15. In addition, the plugs 48 are each preferably formed at one side with a partly spherical recess or seat, as indicated at 51, for the purpose of facilitating the swivel action of the tie-bolts 15 which extend through an opening 50 through the respective plugs 48, and which swivel action takes place responsive to angular or rotative movement of the primary brake disk 14. To this end, the tie-bolts are also each preferably provided with a head 52 on their ends opposite to the T-shaped heads 16, and the heads 52 are each provided with a partly spherical surface 53 for cooperation with the respective seats 51 in the plugs 48.

It will be observed from the foregoing description and from the illustrations in the drawings that in dismounted condition the brake assembly is in a unitary form, as maintained by the cap screws 10, thus permitting the assembly to be applied as a unit to the mounting flange 3 and removed therefrom, as the occasion requires. This has the particular advantage of enabling the brake to be preassembled and adjusted before application to the wheel, as well as permitting the brake unit to be replaced by another assembly unit without disassembling the individual parts of the brake. The application of the brake unit to the mounting flange 3 may be quickly made by the bolts 8 which extend completely through the secondary brake disk 11 and the radial flange 7 of the stationary plate 4, as well as through the mounting flange 3, said bolts 8 being equidistantly spaced from one another in groups lying between the cap screws 10.

As shown in Figure 2, the plate 4 is preferably provided with a second boss 54 in diametrically opposed relation to the inlet boss 33, said boss 54 having a passage therethrough leading into the pressure channel 35 and being fitted with a bleeder screw 55 to permit the brake to be bled from time to time, as the occasion may require.

While the specific details have been herein shown and described, the invention is not confined thereto, as changes and alterations may be made without departing from the spirit thereof as defined by the appended claims.

I claim:

1. In a disk brake of the class described, a supporting plate, a pair of brake members connected to said supporting plate in axially spaced relation to each other, with one of said brake members mounted for axial movement towards and away from the other, each of said brake members being composed of a plurality of separate disk sections forming a space between the adjacent ends of said sections, connecting means disposed between and extending loosely into recesses in the end faces of said disk sections for holding said sections in disk formation while permitting their thermal expansion and contraction independently of each other, means extending through the connecting means aforesaid for one of said brake members for attaching the same to said supporting plate, and a member to be braked disposed between the brake members aforesaid and axially movable with the axially movable brake member.

2. In a disk brake of the class described, a supporting plate, a pair of brake members connected to said supporting plate in axially spaced relation to each other, with one of said brake members mounted for axial movement towards and away from the other, each of said brake members being composed of a plurality of separate disk sections forming a space between the adjacent ends of said sections, and having means connecting the adjacent ends of the sections together in assembled relation to each other, said connecting means consisting of disk-like members extending into arcuate recesses in the end faces of adjacent sections for holding the sections in disk formation while permitting said sections to adjust themselves circumferentially and laterally, means for fixedly connecting the sections of one of said brake members to the supporting plate, separate means for yieldably connecting the sections of the other brake member to said supporting plate, and a member to be braked disposed between the brake members aforesaid and axially movable with the axially movable brake member.

3. In a disk brake of the class described, a supporting plate, a pair of brake members connected to said supporting plate in axially spaced relation to each other, with one of said brake members mounted for axial movement towards and away from the other, each of said brake members being composed of a plurality of separate disk sections forming a space between the adjacent ends of said sections, and having connecting means bridging the space between the adjacent ends of the sections and having slidable connection therewith for connecting the sections together in assembled relation to each other, and a member to be braked disposed between the brake members aforesaid and axially movable with the axially movable brake member, and spring actuated means passing through the connecting means of the sections of the axially movable brake member for normally tensioning the latter away from the member to be braked.

4. In a disk brake of the class described, a supporting plate, a pair of brake members connected to said supporting plate in axially spaced relation to each other, with one of said brake members mounted for axial movement towards and away from the other, each of said brake members being composed of a plurality of separate disk sections forming a space between the adjacent ends of said sections, and having connecting plugs in the adjacent ends of the sections for connecting the same together in assembled relation to each other, and a member to be braked disposed between the brake members aforesaid and axially movable with the axially movable brake member, said connecting plugs for the disk sections of the axially movable brake member being apertured, in combination with connecting means extending through the apertures of the plugs for connecting the last-mentioned brake member to the supporting plate.

5. In a disk brake of the class described, a supporting plate, a pair of brake members connected to said supporting plate in axially spaced relation to each other, with one of said brake members mounted for axial movement towards and away from the other, each of said brake members being composed of a plurality of separate disk sections forming a space between the adjacent ends of said sections, and having connecting plugs in the adjacent ends of the sections for connecting the same together in assembled relation to each other, and a member to be braked disposed between the brake members aforesaid and axially movable with the axially movable brake member, said connecting plugs for the disk sections of the axially movable brake member being apertured, in combination with tie-bolts extending through the apertures of the plugs for connecting the last-mentioned brake member to the supporting plate.

6. In a disk brake of the class described, a supporting plate, a pair of brake members connected to said supporting plate in axially spaced relation to each other, with one of said brake members mounted for axial movement towards and away from the other, each of said brake members being composed of a plurality of separate disk sections forming a space between the adjacent ends of said sections, and having connecting plugs in the adjacent ends of the sections for connecting the same together in assembled relation to each other, and a member to be braked disposed between the brake members aforesaid and axially movable with the axially movable brake member, said connecting plugs for the disk sections of the axially movable brake member being apertured, in combination with tie-bolts extending through the apertures of the plugs for connecting the last-mentioned brake member to the supporting brake, and spring means disposed between the tie-bolts and the supporting plate to normally yieldingly urge said axially movable brake member in a direction away from the other brake member.

HOMER T. LAMBERT.